May 5, 1959     A. P. FALL     2,884,654
WIPER RING
Filed July 21, 1951
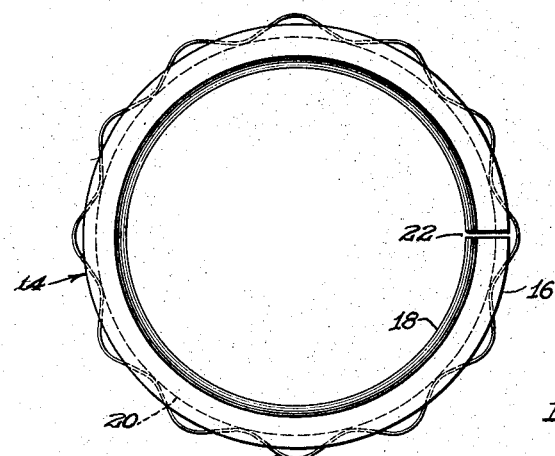
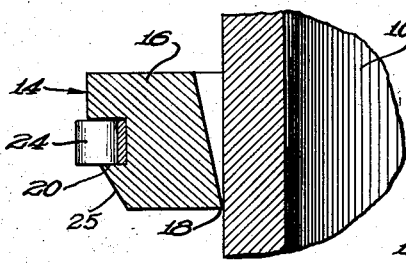
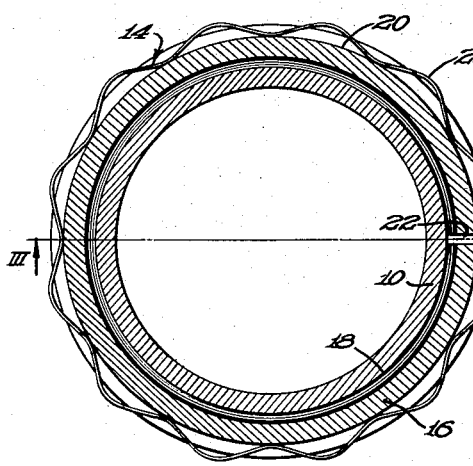
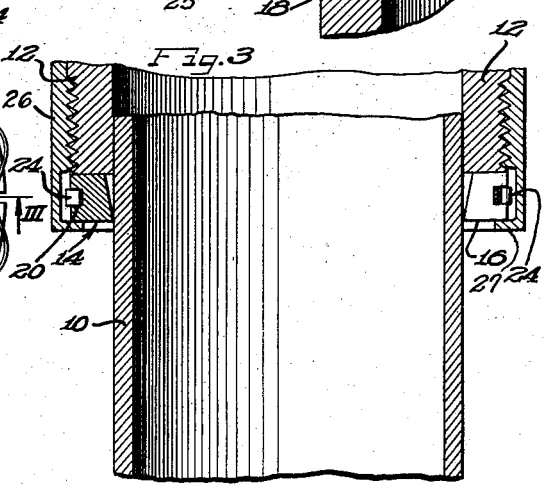
Inventor
Albert P. Fall

United States Patent Office 2,884,654
Patented May 5, 1959

2,884,654
WIPER RING

Albert P. Fall, Toledo, Ohio; Emory A. Fall, administrator of the estate of said Albert P. Fall, deceased, assignor, by mesne assignments, to Ace Products Company, Toledo, Ohio Application July 21, 1951, Serial No. 237,935

3 Claims. (Cl. 15—104.04)

This invention relates to an improved scraper ring for wiping oil, dirt and the like from the cylindrical outer surface of a rod, tube or similar structure. More particularly, this invention has to do with a scraper ring which effects a wiping action due to an inwardly acting continuous ring member disposed around the wiper ring.

In many mechanisms, a rod or plunger is arranged to telescope inside a tube during normal operation. A typical installation of this kind is an alighting gear for an airplane which incorporates a shock absorber therein. In normal position, the plunger or rod extends out of the tubular casing but when the shock absorber comes into operation the rod slides partially into the casing.

In such a mechanism it is desirable that all dirt, grit, frost, ice or moisture which adhere to the surface of the rod be removed before the rod slides into the casing, since introduction of this contaminating matter will cause failure of the packing glands of the assembly.

According to the features of the present invention there is provided a split wiper ring which has on its inner periphery a scraping edge disposed in close contact with the outer cylindrical surface of a telescoping rod. A continuous ring is disposed around the split wiper ring and is arranged to exert an inward pressing action against the split ring to urge it against the rod.

It is an important object of the present invention to provide a novel, efficient wiper ring assembly.

Another object of the present invention is to provide a wiper ring which is pressed against the surface to be wiped by means of a one-piece continuous, sinuous spring member.

A still further object of this invention is to provide a scraper ring assembly including a one-piece split annulus and a continuous spring encircling said annulus under tension for urging said annulus into a contracted state.

A still further object of this invention is to provide a wiper ring assembly which does not require an outer clamping cover to hold the members thereof in position and urge them into scraping engagement.

Other and further features, objects and advantages of the present invention will be apparent to one skilled in the art from the following detailed description of the annexed sheet of drawings.

On the drawings:

Figure 1 is a top plan view of the novel wiper ring assembly of the present invention.

Figure 2 is a sectional view taken through the ring groove of the wiper ring assembly of Figure 1 with the assembly mounted on a tubular member.

Figure 3 is a fragmentary vertical sectional view taken substantially on line III—III of Figure 2.

Figure 4 is an enlarged fragmentary sectional view illustrating a slightly modified form of the wiper ring assembly.

As shown on the drawings:

In the various figures of the drawings, the reference numeral 10 indicates a tubular rod, plunger or other cylindrical member which is arranged to telescope inside a cylinder 12. A wiper ring assembly 14 is disposed about said rod 10 and includes a ring 16 of suitable metal or alloy having a scraping edge 18 formed on its lower inner periphery and an annular groove 20 cut in its outer peripheral surface substantially midway between the side faces of the ring. The ring 16 is split, as at 22, to provide for its contraction. A one-piece continuous ring-like spring 24 of spring steel or other suitable material is positioned in the groove 20 under tension to press the scraping edge 18 of the ring 16 radially inwardly into tight contact with the wall of the rod 10. The spring 24 has a serpentine or wavy form which permits the spring to be stretched when sliding the spring over the ring 16 to position it in the groove 20.

To facilitate further the assembly of the spring 24 in the groove 20, one of the side walls of the groove may be cut away about its entire periphery to provide a sloping annular surface, indicated at 25 in Fig. 4, over which the spring may be more readily stretched.

The effective inside diameter of the spring ring 24 is such that it exerts a contracting force upon the wiper ring 16 tending to bring the ends of the wiper ring together at the split 22. Thus, when assembled in place on the tubular member 10, the spring ring 24 will, due to the tension under which it is placed, press the split ring 16 inwardly and cause the scraping edge 18 to closely engage the tubular member 10. The need of a clamping cover member encircling the spring ring 24 is thereby obviated.

The wiper ring assembly 14 may be secured to the lower end of the cylinder 12 in any convenient manner so that it will not be separated from the cylinder when the rod 10 is retracted from the cylinder 12. As illustrated, the wiper ring assembly is confined against the lower end of the cylinder 12 by means of a ring-like cap 26 that is threaded onto the lower end of the cylinder and that has an inturned flange portion 27 abutting the ring assembly.

From the foregoing description it will be seen that there is provided in this invention a novel wiper ring assembly featuring a continuous serpentine spring-like ring which is under tension to urge a split annulus into tight scraping engagement with a telescoping rod. This ring assembly is simple in construction in that it consists of only two members, the split annular ring and the continuous, tensioned outer ring. It can be preassembled and quickly installed as a unit when needed.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A wiper ring for scraping and cleaning the surface of an axially movable shaft with substantial pressure equally distributed around the circumferential surface thereof, comprising a cleaning ring having a split therein extending transversely thereof, said cleaning ring having its interior surface tapered inwardly forming a narrow working edge adapted to bear against said shaft, the outer surface of said cleaning ring being provided with an outwardly open groove the base of which has a predetermined diameter, and a generally ring-shaped continuous closed compression member in the form of a length of relatively stiff metal dimensioned to be received in said groove and of a length greater than the circumference of said groove joined at its ends and bent upon itself into a series of similar sections of substantially equal length disposed end-to-end and having their radially innermost points lying on the circumference of a circle having a normal diameter less than said diameter of the base of said groove, said compression member being deformably received in said groove with said innermost points deflected outwardly by contact with said base with resulting internal stress in said member distributed uniformly over the circumference thereof to compress said cleaning ring into uniform pressure scraping contact with said shaft solely by the internal forces developed by said deflection.

2. A wiper ring for scraping and cleaning the surface of an axially movable shaft with substantial pressure equally distributed around the circumferental surface thereof, comprising a cleaning ring having a split therein extending transversely thereof, said cleaning ring having its interior surface tapered inwardly forming a narrow working edge adapted to bear against said shaft, the outer surface of said cleaning ring being provided with an outwardly open reduced diameter annular surface which has a predetermined diameter, and a generally ring-shaped continuous closed compression member in the form of a length of a relatively stiff metal dimensioned to be received on said reduced diameter surface and of a length greater than the circumference of said reduced diameter surface joined at its ends and bent upon itself into a series of similar sections of substantially equal length disposed end-to-end and having their radially innermost points lying on the circumference of a circle having a normal diameter less than said predetermined diameter of said reduced diameter surface, said compression member being deformably received on said reduced diameter surface with said innermost points deflected outwardly by contact with said reduced diameter surface with resulting internal stress in said member distributed uniformly over the circumference thereof to compress said cleaning ring into uniform pressure scraping contact with said shaft solely by the internal forces developed by said deflection.

3. A wiper ring for scraping and cleaning the surface of an axially movable shaft with substantial pressure equally distributed around the circumferential surface thereof, comprising a cleaning ring having a split therein extending transversely thereof, said cleaning ring having its interior surface tapered inwardly forming a narrow working edge adapted to bear against said shaft, the outer surface of said cleaning ring being provided with an outwardly open groove the base of which has a predetermined diameter, and a generally ring-shaped continuous closed compression member in the form of a length of relatively stiff metal dimensioned to be received in said groove and of a length greater than the circumference of said groove joined at its ends and bent upon itself into a series of similar sections of substantially equal length disposed end-to-end and having their radially innermost points lying on the circumference of a circle having a normal diameter less than said diameter of the base of said groove, said compression member being deformably received in said groove with said innermost points deflected outwardly by contact with said base with resulting internal stress in said member distributed uniformly over the circumference thereof to compress said cleaning ring into uniform pressure scraping contact with said shaft solely by the internal forces developed by said deflection, said cleaning ring being provided with an annular chamfered corner between the outer surface and one side thereof for permitting installation of said compression member in said groove without use of a separate expanding tool.

References Cited in the file of this patent

UNITED STATES PATENTS

| | | |
|---|---|---|
| 1,327,801 | Bloche | Jan. 13, 1920 |
| 1,512,362 | Phelps | Oct. 21, 1924 |
| 1,556,312 | Davis | Oct. 6, 1925 |
| 1,966,782 | Zeledon | July 17, 1934 |
| 2,443,853 | Fall | June 22, 1948 |
| 2,560,775 | Olsen | July 17, 1951 |

FOREIGN PATENTS

| | | |
|---|---|---|
| 801,353 | Germany | Jan. 4, 1951 |